Sept. 10, 1935.  A. W. WOODWARD  2,014,348

DISK BRAKE

Filed May 19, 1934  2 Sheets-Sheet 1

Inventor
Alva W. Woodward
By
Attorney

Sept. 10, 1935. A. W. WOODWARD 2,014,348
DISK BRAKE
Filed May 19, 1934 2 Sheets-Sheet 2

Inventor
Alva W. Woodward

Patented Sept. 10, 1935

2,014,348

UNITED STATES PATENT OFFICE 2,014,348

DISK BRAKE

Alva W. Woodward, Kent, Ohio, assignor, by mesne assignments, to Wingfoot Corporation, Wilmington, Del., a corporation of Delaware Application May 19, 1934, Serial No. 726,589

6 Claims. (Cl. 188—18)

This invention relates to a brake and more particularly to a disk brake adapted for use with a wheel structure in which the tire is mounted directly on the hub.

Wheels of this type are usually equipped with super-balloon tires of relatively low pressure and are in general use on aircraft. Since the hubs of these wheels must necessarily be of small diameter, any brake associated therewith must have a correspondingly small diameter and occupy as little space as possible consistent with obtaining satisfactory braking action.

Accordingly it is an object of this invention to provide a brake of a size which can be fitted within the confines of one of the tire retaining flanges on the wheel or hub, but which may be extended axially beyond such flange if it becomes desirable to increase the braking action.

Another object is to provide a brake which may be quickly and compactly associated with the wheel or hub.

A further object is to provide a brake structure wherein the braking surfaces are arranged radially with respect to the wheel axle, certain of these surfaces being rotatable with the wheel while others are fixed against rotation.

A further object is to provide novel means for operating the brake.

Other objects and advantages will become apparent from the following description, in conjunction with the accompanying drawings, wherein I have shown one embodiment of the invention, and wherein Fig. 1 is a longitudinal sectional view illustrating one form the invention may assume;

Figure 1:
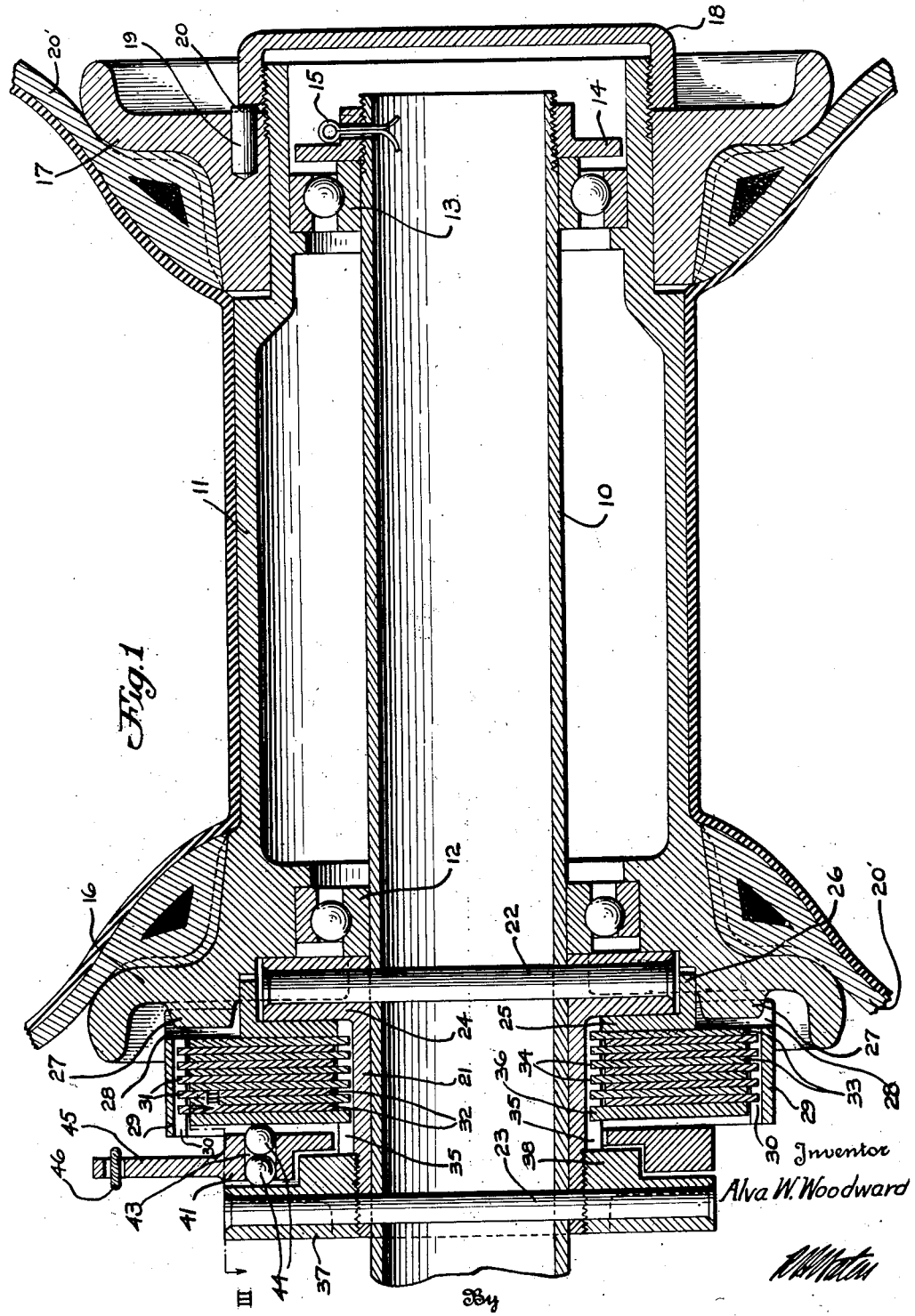

Referring to the drawings, the numeral 10 indicates a non-rotative, hollow axle, on which is journaled a rotatable cylindrical hub 11 through the medium of ball bearings 12 and 13. The end of the axle 10 is threaded to receive a bearing retaining collar 14 and one or more cotter pins 15 may be used to secure the collar.

The hub 11 is provided with a tire retaining flange 16 which is shown integral therewith but which may be formed separately and secured to the hub. A second tire retaining flange 17 is secured on the opposite end of the hub and is held in place by a combination cover and retaining member 18 which is threaded onto the end of hub 11. To prevent accidental unscrewing of the member 18, one or more pins 19 are arranged in the end of flange 17 and these pins extend into suitable notches 20 formed in member 18. This locking arrangement requires that the flange 17 be capable of limited axial movement so that the member 18 may be turned when necessary, but this flange will not move while an inflated tire 20' is in proper position on the hub.

Adjacent the inner end of the hub an axial sleeve 21 is secured to the axle by fastening means such as bolts 22 and 23. This sleeve serves to retain bearing 12 in proper position and has a radially extending flange 24 abutting the hub. Suitable means (not shown) for reducing the friction between the hub and sleeve may be provided in the customary manner.

Referring now to the braking mechanism, numeral 25 indicates a drum shaped brake member having an axially extending flange 26 projecting into the space between the hub and flange 24 to insure proper alinement of the brake with the wheel. The drum 25 abuts flange 24, and any suitable means (not shown) may be utilized to reduce friction between these parts. Likewise, friction between flange 26 and the hub may be reduced in the customary manner. This drum 25 is secured to and carried by flange 16 for rotation therewith by virtue of a plurality of spaced radial lugs 27 formed on the flange, which lugs project into similarly spaced openings 28 formed in the drum, thereby providing positive means to prevent relative rotation between the drum and flange.

As shown, the cylindrical portion 29 of the drum is provided with a plurality of keyways 30, in this instance four, which receive radial lugs 31 formed on a plurality of spaced braking disks 32. This arrangement insures a splined connection between drum 25 and disks 32 whereby the disks can move axially with respect to the drum and rotate therewith, but cannot rotate relative thereto.

Positioned between disks 32 are a plurality of cooperating non-rotatable braking disks 33 which are provided with radial lugs 34 extending into keyways 35 formed in the axial portion of sleeve 21. Thus, disks 33 can have longitudinal movement with respect to sleeve 21, but cannot rotate. While I have shown five of each type disk 32 and 33 it will be obvious that the number may be decreased or increased depending upon the braking action required. Outwardly of the outermost disk I place a pressure operating disk 36, which preferably is somewhat thicker than the other disks. Disk 36 is secured to sleeve 21 in the same manner as disks 33.

Figure 3:
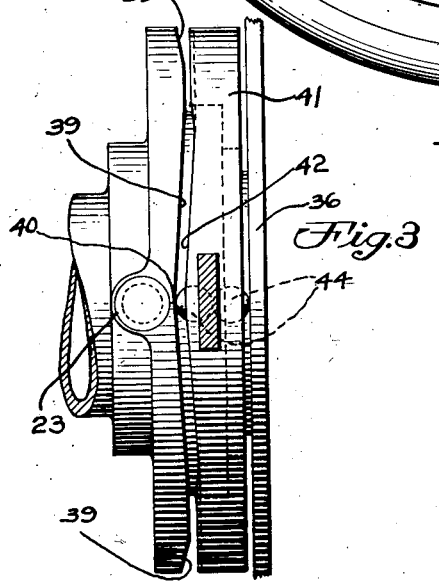
Fig. 3 is a partial plan view with part in section viewed substantially on line III—III of Fig. 1, illustrating the operating means for the brake.

Means are provided to move disk 36 axially and thereby to move disks 32 and 33 to apply a braking action. As shown in Figs. 1 and 3 a collar 37 is threaded onto the end of sleeve 21 and fixed to the sleeve and axle by bolt 23. This collar 37 is reduced in diameter adjacent its inner end as shown at 38 and outwardly of the reduced portion the inner surface of the collar is provided with a plurality of cam surfaces 39 (see Fig. 3) each of which has a low point 40 from which the cam surfaces incline, as clearly shown in Fig. 3. Between disk 36 and collar 37, a brake operating member 41 is arranged for limited rotation and is provided on its surface adjacent the collar with cam surfaces 42 complementary to cam surfaces 39. A plurality of transverse openings 43 are formed through member 41, the number of such openings corresponding with the number of cam surfaces provided, and a pair of balls 44 is arranged in each opening 43 whereby these balls will extend slightly beyond the sides of member 41 into engagement with disk 36 and collar 37. When the disks are out of braking engagement the position of each pair of balls 44 corresponds to the showing in Fig. 3 wherein the balls adjacent collar 37 are at the innermost point on the respective cam surfaces 39. Obviously, when member 41 is rotated the balls will move over the cam surfaces and force disk 36 axially to move the brake disks into braking engagement.

Figure 2:
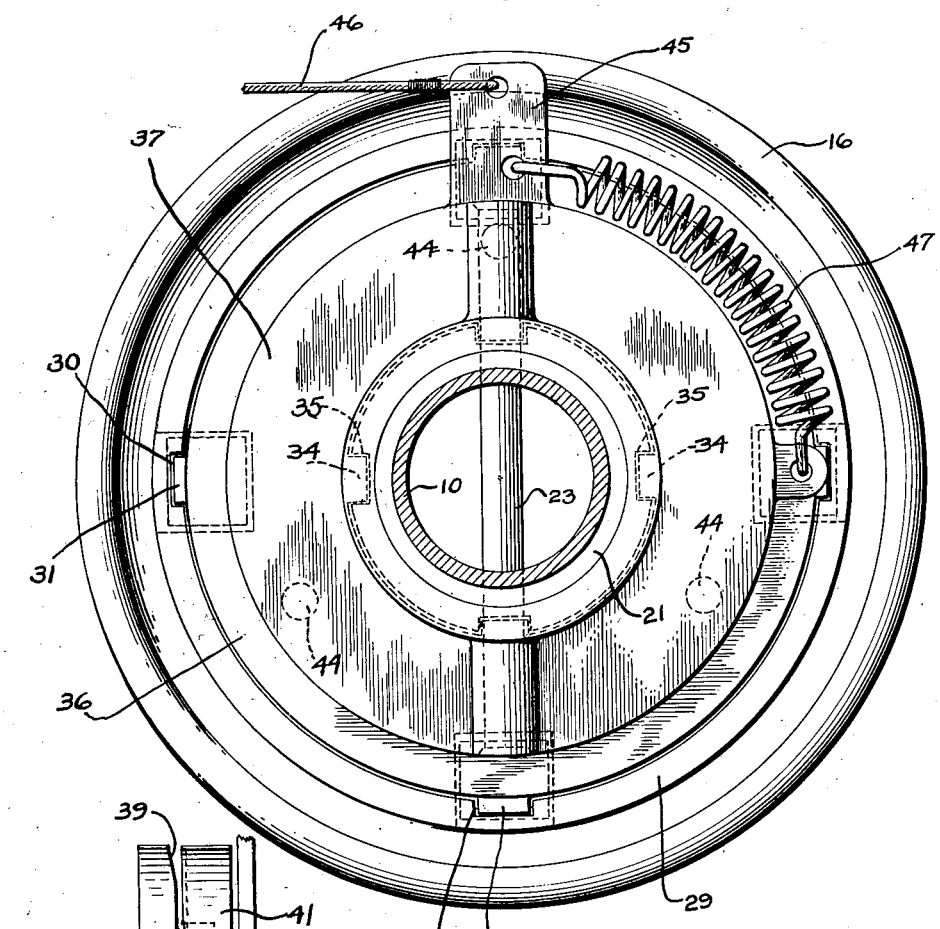
Fig. 2 is an end elevation of same.

An extension 45 is formed on member 41 and a suitable means, such as cable 46, may connect the extension to a brake lever of the vehicle on which the brake is used. As shown in Fig. 2, member 41 is rotated against the action of a spring 47, which spring will return the member to its original position when the brakes are released.

The operation of the device is as follows:

When it is desired to apply the brake, disks 32 will be rotating with drum 25 and the hub 11 by reason of the various connections therebetween, while discs 33 and 36 will not be rotating. Accordingly, when member 41 is rotated in the manner described the non-rotating and rotating disks will be moved axially whereby to bring into engagement the radial braking surfaces of the various disks. It will be noted that a radial brake surface also is provided on the inner wall of drum 25, which surface is engaged by the innermost disk 33.

It will be understood that various materials can be used for the braking disks. These disks can be formed of metal provided with a face of fibrous braking material, or they may be made wholly of metal. Also the disks can be run dry or with a lubricant, as desired.

It is believed to be apparent that the invention provides an efficient brake which is simple and positive in operation, which can be applied to various vehicles and which can be arranged either wholly or partially within the confines of a tire carrying flange. Moreover the brake is positioned at one side of the hub where heat generated can be readily dissipated by radiation and by the cooling action of air flowing over the brake.

Although I have illustrated one form of the invention, it will be apparent to those skilled in the art that the invention is not limited to such form but that various modifications may be made without departing from the spirit of the invention or from the scope of the subjoined claims.

What I claim is:

1. A vehicle wheel comprising in combination, an axle, a hub, a tire retaining flange mounted on said hub, a brake drum connected to said flange for rotation with the hub, a separate means for alining the drum with the hub, a plurality of axially movable brake disks operatively arranged in said drum and means for moving said disks.

2. A vehicle wheel comprising, in combination, an axle, a hub, a tire retaining flange mounted on said hub, said flange being provided with a plurality of spaced radial lugs, a brake drum having a plurality of grooves to receive said lugs to rotate the drum with said flange, means for axially alining the drum with the hub, a plurality of axially movable brake disks operatively arranged in said drum, and means for moving the disks.

3. A vehicle wheel comprising, in combination, an axle, a hub provided with a plurality of spaced radial lugs, a brake drum having a plurality of grooves to receive said lugs to rotate the drum with the hub, means for axially alining the drum with the hub, a plurality of axially movable brake disks operatively arranged in said drum, and means for moving the disks.

4. A vehicle wheel comprising in combination, an axle, a hub, a tire retaining flange mounted on said hub, a brake drum connected to said flange for rotation with the hub, means for aligning the drum with the hub, and braking members operatively associated with said drum.

5. A vehicle wheel comprising, in combination, a wheel, a hub, a tire retaining flange mounted on said hub, said flange being provided with a plurality of spaced radial lugs, a brake drum having a plurality of grooves to receive said lugs to rotate the drum with said flange, means for axially aligning the drum with the hub, and braking members operatively associated with said drum.

6. A vehicle wheel comprising, in combination, a wheel, a hub provided with a plurality of spaced radial lugs, a brake drum having a plurality of grooves to receive said lugs to rotate the drum with the hub, means for axially aligning the drum with the hub, and braking members operatively associated with said drum.

ALVA W. WOODWARD.